United States Patent Office 3,339,609
Patented Sept. 5, 1967

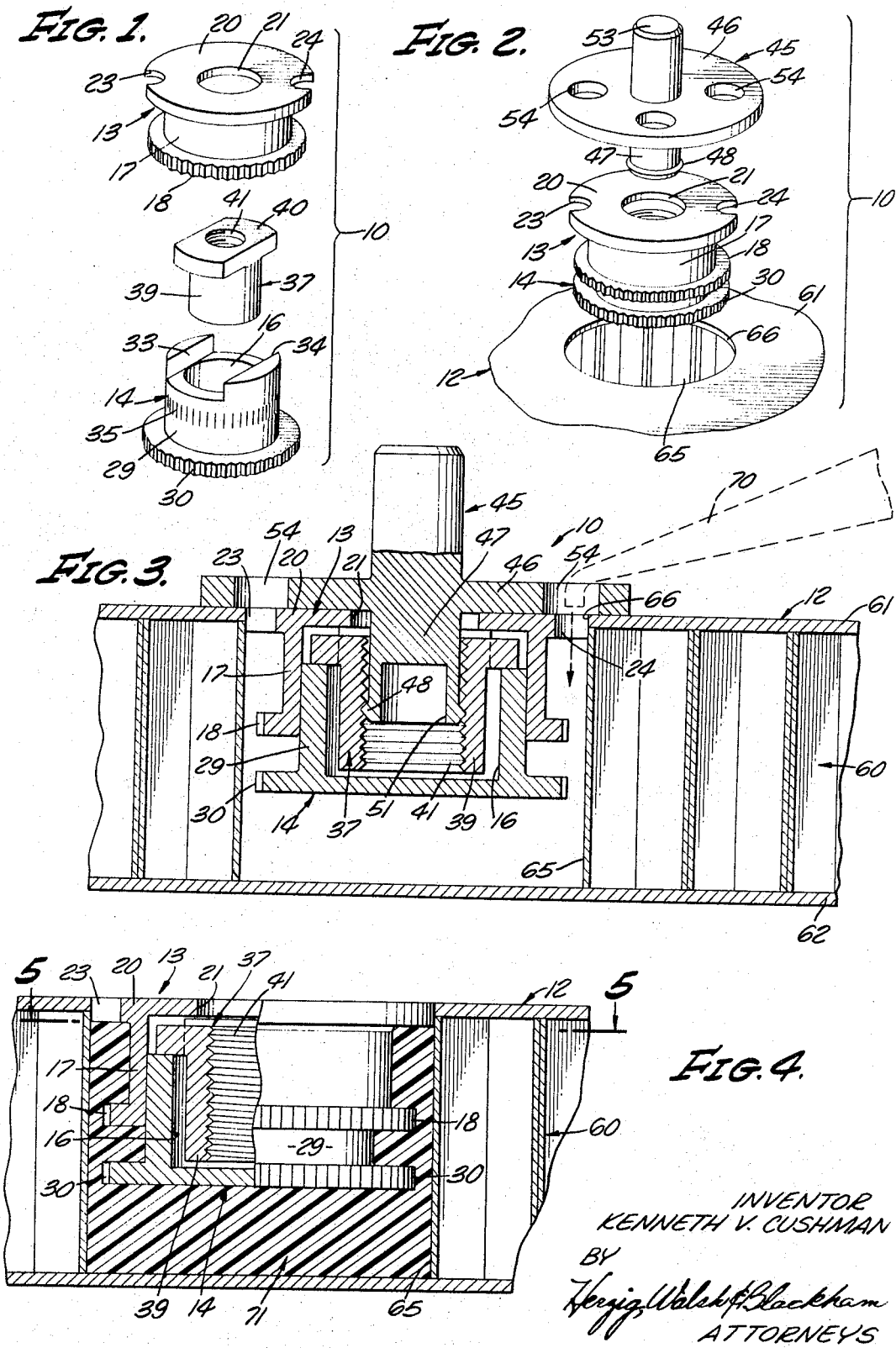

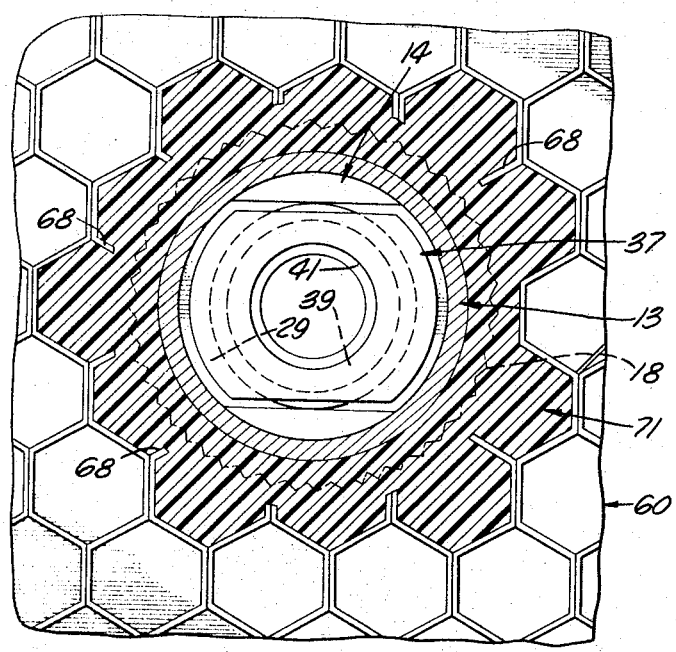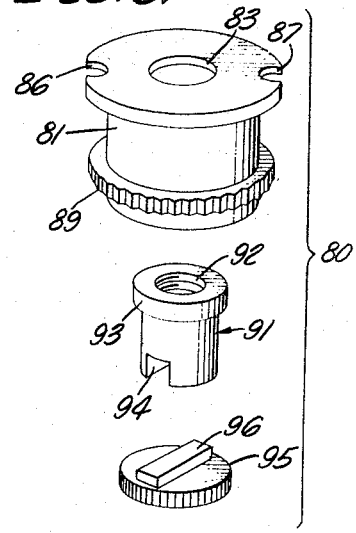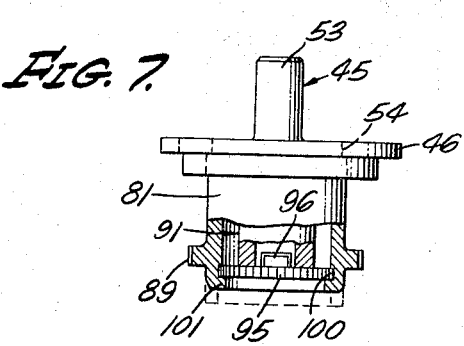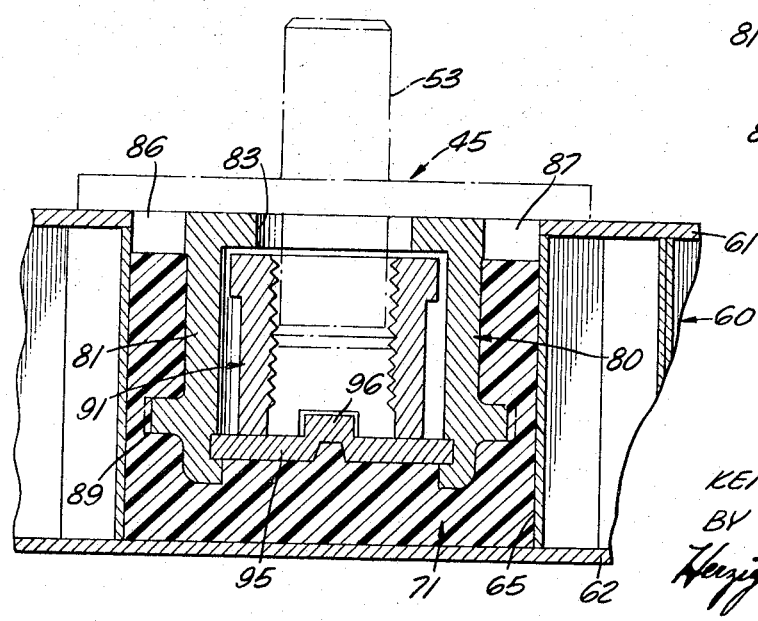

3,339,609
FLOATING NUT INSERT
Kenneth V. Cushman, Santa Ana, Calif., assignor to The Delron Company, Inc., Santa Ana, Calif., a corporation of Nevada
Filed Aug. 2, 1965, Ser. No. 476,400
2 Claims. (Cl. 151—41.7)

This invention relates generally to fastener fittings for light-weight sandwich panels such as are used in the interior walls and for construction of airplane fuselages and, in particular, to the type of fastener fitting known in the industry as a "molded insert" fastener. In general, such fasteners utilize a solidified body of cement or anchoring material, such as epoxy resin molded into a cavity in the sandwich panels and around the inserts so as to anchor the insert within the panel with one end of the insert exposed in an opening in one side of the panel for securement to the insert, and thus to the panel of another fastener part which is a threaded nut or screw extending through a bracket or other member to be attached to the panel and threaded into the insert.

In the types of panels referred to, generally there is a central body or core constructed of extremely light-weight aluminum ribbon material, that is, foil, which because of the honeycomb cell structure provides adequate strength in the aggregate over the entire area of the panel. The structure is cellular, the cells having parallel axes normal to the planes of the outer skin sheets. The strength is due to the extremely large number of cells of quite small diameter, and that the thin skin sheets are bound together in a fairly rigid, but extremely light-weight sandwich, construction. These panels, while having many advantages, present difficulties including the tendency of the attached parts to pull loose from the panels, and also to damaging of the panel surface where fasteners are riveted or otherwise forcibly attached to the panel.

The primary object of the present invention is to provide an improved, light-weight sandwich panel construction embodying an insert anchored therein by a molded body and having a floating nut for self-aligning reception of a threaded stud or screw. The improvements lie primarily in the construction of the insert body and floating nut, as stated more specifically hereinafter. The improvements are calculated to overcome the deficiencies as set forth in the foregoing.

A more specific object is to provide a floating nut molded insert as described having particular construction to improve its versatility. One of the objects resides in a construction or configuration involving an insert made in two parts so as to improve its versatility as respects the design of the head, i.e., it is possible to use heads or end members of different types as described more in detail hereinafter.

Another object is to improve the economy of manufacture and production of the molded inserts by making it possible to start with a piece of stock of smaller diameter, rather than cutting down a piece of larger diameter to a smaller size barrel.

Another object is to improve the molded insert by eliminating the need for a flat end disc by not having a bore all the way through the insert.

Another object is to provide a molded insert as described made in several parts to receive a floating insert nut, the insert nut and one of the parts having mutual interfitting configurations to hold the insert nut against rotation. A further object is to provide a molded insert of this construction wherein one of the parts of the insert has a keyway in the inner end thereof to receive an integral projecting key on the insert nut to hold the nut against rotation.

Another object is to provide an improved method of installation of the insert nut in the honeycomb panel. Ordinarily, the insert is molded into a blind bore or hole in the honeycomb panel. Preferably, the insert member is held in a position with its top head or flange in a position in the outer end of the hole with the flange flush with the surface of the outer surfaec of the skin sheet of the panel. The anchoring material, or resin and catalyst are then injected through an aperture in the outer head of the insert member into the hole in the space around the insert and in the space between the bottom head and the bottom of the hole.

The herein invention provides an improvement comprising a disposable or throw-away retainer cap for holding the insert in the hole while the anchoring material is being injected. The disposable cap is in the form of a flange, having central stems including a downwardly extending stem with a rib on it. This stem is inserted into the internally threaded floating nut within the insert with the flange flush against the top head of the insert member. The insert member is then inserted in the hole in the honeycomb panel with the periphery of the flange of the disposable cap resting on the outer skin sheet so that the insert is held in the correct position. The flange on the disposable cap member has an aperture registering with one or more apertures in the outer head of the insert and the anchoring material is then injected with an ordinary injector gun through the apertures into the space around the insert. In this manner, a standard commercial injector gun can be used without the need of any special adapter on the gun for the purpose of making the injection. After installation of the insert, the disposable cap is removed and discarded, since the cap can be made at negligible cost.

A further object of the invention is to provide this improved method of installation of the floating nut inserts.

Further objects and additional advantages of the invention will become apparent from the following detailed description and annexed drawings wherein:

FIGURE 1 is a disassembled view of a preferred form of molded insert member;

FIGURE 2 is a view similar to that of FIGURE 1 showing the parts assembled and also showing the disposable retainer cap;

FIGURE 3 is a sectional view of a honeycomb or panel and showing the insert member and disposable cap in cross section;

FIGURE 4 is a sectional view similar to that of FIGURE 3 showing the anchoring resin material molded into the opening in the honeycomb panels;

FIGURE 5 is a sectional view taken along the line 5—5 of FIGURE 4;

FIGURE 6 is an exploded or disassembled view of another form of insert member;

FIGURE 7 is a view of the form of the insert of FIGURE 6 in assembled relationship;

FIGURE 8 is a sectional view of a honeycomb panel and the insert assembly of FIGURES 6 and 7 with the disposable holding cap in position.

Reference will now be made more in detail to FIGURES 1 to 5 of the drawings. The preferred form of insert member is shown generally at 10 in FIGURE 1; this insert member is shown in position in the honeycomb panel 12 in FIGURE 3. The insert member 10 is made in two tubular parts, as designated at 13 and 14 which fit together telescopingly. That is, the part 14 fits into the part 13. Part 14 has a bore 16 as shown. The part 13 has a tubular body part 17 which has an extending serrated flange 18. It has a top circular flange or head 20 having a central opening 21 and peripheral arcuate cutouts 23 and 24.

The bottom tubular part or member 14 has a barrel part 29 and a lower or bottom cylindrical flange or head 30 which is serrated as shown. The barrel part 29 at the upper end is slotted to form a transverse keyway formed by the extending leg or yoke parts 33 and 34. The part 29 has grooves or serrations as shown at 35.

Numeral 37 designates the floating insert nut which has a tubular barrel part 39 and an integral transversely extending key as designated at 40. The nut 37 has a threaded bore as designated at 41.

FIGURE 2 shows the insert member and floating nut in assembled relationship adjacent to the honeycomb panel 12. In this figure there is shown at 45 a disposable holding or retainer cap which is used to hold the insert member in position while it is being installed, that is anchored in the panel 12. The disposable cap member 45 may be made of plastic or other inexpensive material. It comprises a flange 46 having an extending cylindrical stem 47 which has a rib 48 on the end of it. The stem 47 may have a bore in the end of it, as designated at 51. Extending upwardly from the flange 47 is a stem 54 as shown. The flange 46 has apertures therein as shown at 54 which may be brought into registry with the arcuate cutouts 23 and 24 in the upper head 20 of the insert part 13.

FIGURE 3 shows the insert 10 and disposable holding cap 45 in position in the opening or hole in the panel 12.

As pointed out in the foregoing, the panel 12 is of a lightweight type commonly used in finishing the interior of airplanes where maximum lightness is required. Such panels are also used in fuselage skin structure and wing skin structures. In such a panel, the central body or core 60 is commonly constructed of extremely light-weight aluminum ribbon material such as foil, which because of the honeycomb cell structure provides adequate strength in the aggregate over the entire area of the panel. The axis of the cells formed are parallel and normal to the planes of the outer thin skin sheets 61 and 62. The outer skin sheets are bound together in a fairly rigid, but extremely light-weight sandwich construction, with an extremely large number of cells of quite small diameter between them. As indicated in the foregoing, the primary object of the herein invention is to provide improved means for making securements to panels of the type shown in FIGURES 3, 4 and 5. The skin sheets 61 and 62 are secured as by cementing, brazing or welding to the edges of the low density core 60. The panel is provided with a hole 65 which is closed at the bottom by the other skin sheet 62. The hole 65 includes circular opening 66 in the skin sheet 61 and is bounded by radially inwardly projecting extremities 68 of the cellular walls of the core 60. Between the projections 68, there are lateral recesses as shown bordering the hole or opening 65.

As may be seen in FIGURE 4, the barrel or tubular part of the insert member loosely receives the internally threaded sleeve 39 of the insert nut 37. The insert nut is able to receive the threaded stem of a fastening or securing member extended through the bore 21 and since it is floating within the insert 10, is self aligning with such threaded securing stem. When the parts of the insert are assembled, the insert nut 37 is caged within the insert as may be seen from the figures.

In the installation of the insert, a body of anchoring material of high adhesive tenacity, when solidified, is injected into the hole or opening 65 in a liquid or semi-liquid form. The anchoring material is preferably resin, and a catalyst or curing agent for causing the body of liquid resin to solidify into a hard rigid anchor body is mixed with the resin prior to injection. The preferred manner of installation is illustrated in FIGURES 3 and 4. The insert member 10 with the insert nut 37 in it, is held in position by the disposable retainer cap 45 with apertures 54 in the flange 46 aligned with arcuate cutouts 23 and 24. Numeral 70 designates the nozzle part of a resin injection gun which may be of standard commercial construction. No particular adapter or other fitting is needed with the nozzle of the gun. It is not necessary to attach the insert to the gun and then place the insert in the hole or opening 65. Instead, the insert is held in the correct position by the disposable holding cap 45 with the upper head or flange 20 in the hole 66, and flush with the top surface of the upper skin sheet 61. The resin is then injected so as to fill all of the spaces around the insert member and the space below it and the radial cavities between the extending extremities 68 as shown in FIGURE 5, the resinous material is designated at 71 in the figures. The resinous material of course engages between the serrations of the serrated flanges 18 and 30 and 35 so that when it solidifies or sets, both parts of the insert are held or restrained from rotation and the insert as a whole is held firmly anchored in the honeycomb panel. The space between the bottom of the insert, that is the lower head 30 and the bottom sheet 62 of the panel is filled with the resinous material. After the anchoring material has set, the disposable retainer cap 45 is removed and discarded. Such retainer caps made of plastic can be produce at negligible cost so that it is not necessary to save them for reuse.

From the foregoing, those skilled in the art will observe that the molded insert, as described above, achieves and realizes all of the objects and advantages as outlined in the foregoing, as well as having many additional advantages that are apparent from the detailed description. Since the insert is in two parts, it adapts itself to use with other types of heads or parts. The insert being made in two parts does not have a bore extending all the way through it, so that an end disc for sealing off such a bore is not necessary.

FIGURES 6, 7 and 8 show a modified form of the invention wherein the insert is constructed slightly differently. In these figures, numeral 80 designates an insert assembly comprising a body having a tubular part 81 having an end flange 82 and a central bore 83. The end flange has arcuate cutouts 86 and 87. It has a radial flange 89 which is serrated as shown.

Numeral 91 designates the floating insert nut. It has a threaded internal bore 92 and flange 93. In the lower end there is a transverse slot or keyway 94. The insert includes a part 95 in the form of a circular closure member having a transverse rib 96 configurated to interfittingly engage with the slot or keyway 94 in the insert nut 91. The rib 96 may be made by cold forming or coining the parent material. The closure member 95 fits into an internal angular groove 100 in the lower part of the body 81 and the lower edges of the body are crimped underneath the closure member 95 as shown at 101. In this manner, the insert nut 91 is caged within the body 81 of the insert member and floats therein. The interfitting engagement of the rib 96 and slot 94 allows sufficient lateral or circumferential float of the insert nut 91 so that it can align itself with a threaded securement member extended through the opening 83 or bore in the flange 82 to be threaded into the bore 92 in the insert nut 91.

FIGURES 7 and 8 show the disposable retainer cap 45 in position whereby the insert member and insert nut are held in position in the honeycomb panel to be molded therein. As may be seen in FIGURE 8, the insert assembly is held in position in the hole 65 in the honeycomb panel with the flange 46 of the disposable retainer cap resting on the upper skin sheet 61. The resinous anchoring material is then injected in the same manner as described in connection with FIGURES 3 and 4. The resinous material and catalyst fill up the hole or opening in the honeycomb panel around the insert assembly including the space below the closure member 95, that is between it and the bottom skin sheet 62. The anchoring material, of course, finds its way between the teeth or serrations on the flange 89 and when it sets the solid material resists and prevents rotation of the body of the insert. The insert is anchored with the top flange or head 82 in the upper end of the hole 65 and flush with the outer surface of the top skin sheet 61. As in the previous embodiment, after the insert has been molded into the honeycomb panel, the disposable cap 45 is merely removed and thrown away since the cost of production of these caps is negligible.

From the foregoing, those skilled in the art will observe that the present embodiment of the invention achieves and realizes the objectives and advantages as outlined in the foregoing, as does the previous embodiment and that this form of the invention has many additional advantages that are apparent from the detailed description.

The foregoing disclosure is representative of preferred forms of the invention and is to be interpreted in an illustrative rather than a limiting sense, the invention to be accorded the full scope of the claims appended hereto.

What is claimed is:

1. For use in a light-weight panel having a honeycomb core and skin sheets secured to the edges thereof, said panel having a hole beginning with a circular opening in one of the said skin sheets and continuing through the said core to the opposite skin sheet; an insert comprising a shell having an outer head in the form of a flat circular radial flange receivable in said circular opening for closing the outer end of the said hole, the said insert having an inner head of radial flange form spaced axially from the said outer head, and adapted to be positioned near the other skin sheet at the bottom of said hole, said insert being of tubular formation, the outer head having a central opening for receiving a fastener bolt, said insert having a nut within it including an internally threaded sleeve portion received within the said tubular insert, said insert comprising parts joined together whereby to retain the said nut within the tubular part of the insert, the said nut and one of the parts of the insert having portions configured to mutually interfit with each other whereby the nut is held from rotation within the body of the insert with the nut encaged within the insert with circumferential clearance so as to have a floating self-aligning action in receiving the end of a bolt extending through said outer head opening, said insert being configurated to be anchored by a body of solidified plastic material molded around the said shell and within the said hole with the said molded body having keyed rotation resisting engagement with said honeycomb core and adhering to said shell to resist rotation of said shell in said panel, said shell in turn securing said nut against rotation by the interfitting engagement of said nut with said insert, one of the said parts of the insert comprising a closure member at the end of the insert, said nut and closure member having a relatively interfitting slot and key relationship whereby the nut is held against rotation in the insert, the said closure member having an integral axially projecting key, said insert nut having a keyway at its lower end for interfittingly engaging said key whereby rotation of said nut is prevented.

2. A molded-in floating nut insert for use in a member having a blind bore or hole in it, in combination, an insert having a barrel portion of smaller diameter than said blind bore and at least one portion of a diameter to fit into said bore; the said barrel portion of said insert being tubular having a bore to receive a fastener bolt, said insert having a nut within it including an internally threaded sleeve portion, said insert comprising parts joined together whereby to cage the said nut within the tubular barrel part of the insert, the said nut and a portion of the insert of smaller diameter having portions mutually configurated to interfit with each other whereby the nut is held from rotation within the body of the insert, with the nut caged within the insert with circumferential clearance so as to have a self-aligning action in receiving the end of a bolt extending through the bore in said one portion of the insert, said insert being configurated whereby to be anchored in said hole by a body of solidified plastic material around the said insert within the hole whereby to have rotation resisting engagement with the walls of the hole and adhering to said insert to resist rotation of said insert in said panel, one of the said portions of the insert comprising a closure member fitting within a portion of the insert of smaller diameter, the said nut and closure member having a relatively interfitting slot and key configuration whereby the nut is held against rotation in the insert, said closure member having an integral axially projecting key, said insert nut having a keyway at its lower end for interfittingly receiving said projecting key whereby rotation of the nut within the insert is prevented.

References Cited
UNITED STATES PATENTS

| | | | |
|---|---|---|---|
| 2,922,456 | 1/1960 | Kann | 151—41.7 |
| 3,016,578 | 1/1962 | Rohe | 151—41.7 |
| 3,019,865 | 2/1962 | Rohe | 151—41.7 |
| 3,130,765 | 4/1964 | Neuschotz | 151—41.7 |
| 3,217,363 | 11/1965 | Rohe et al. | 264—262 |

CARL W. TOMLIN, Primary Examiner.

M. PARSONS, Jr., Examiner.